Dec. 7, 1937. F. GROFF 2,101,431

DENTURE BLANK

Original Filed Dec. 27, 1932

INVENTOR
FRAZIER GROFF
BY
ATTORNEY

Patented Dec. 7, 1937

2,101,431

UNITED STATES PATENT OFFICE 2,101,431

DENTURE BLANK

Frazier Groff, Lakewood, Ohio, assignor, by mesne assignments, to Union Carbide and Carbon Corporation, a corporation of New York Original application December 27, 1932, Serial No. 648,848. Divided and this application December 21, 1934, Serial No. 758,693

9 Claims. (Cl. 32—2)

This invention relates to dentures, and is particularly directed to novel preformed blanks from which dentures may be made. This application is a division of my application Serial No. 648,848, filed December 27, 1932, on which was granted Patent 1,990,903.

A material to form satisfactory dentures must possess certain definite characteristics dictated by the conditions under which dentures are used and by the technique of mechanical dentistry. A satisfactory denture material must be rigid at mouth temperatures, that is, at 98° F. and slightly higher. It must, at body temperatures, resist water and mouth fluids as well as weak acids, such as those occurring in mouth fluids, foodstuffs, beverages, etc., and alcohol and alkalies. It must be tough and mechanically strong. The denture material must be a poor conductor of heat but it must be usable in conjunction with metal grids or inserts to make possible regulated heat transfer through the denture to mouth tissue. It is essential that the denture possess a low coefficient of expansion. The color of the denture or denture material must be substantially unaffected by diffused sunlight, and its color should appear the same in both natural and artificial light. The denture material itself should be colorless or very nearly so in order that it can be modified to the desired shade of color and degree of translucency and brilliancy. It must not contain substances which irritate mouth tissues and the denture material itself must not be irritating to living tissue. It should be stable under molding conditions and to heat generally, and should be moldable under those conditions of pressure and temperature which are readily attained in plaster molds and the usual dental equipment. The denture material should not shrink appreciably upon molding and it must possess good flow and wetting properties in order that it may be molded over inserts, such as artificial teeth and metallic reenforcements, without inducing warpage or strain in the molded denture. The denture material must be capable of accurately receiving the impression of the mold and must have no tendency to unmold. Furthermore, the denture material must be uniform in strength and with respect to all of its properties.

Many substances have been proposed as denture forming materials, but all of them thus far known lack or are deficient in one or more of the above essential properties of suitable denture materials. I have discovered that the most satisfactory material thus far available is a special form of vinyl resin, that is, a resinous product resulting from the polymerization of certain vinyl compounds.

The principal object of my invention is to provide improved denture blanks, especially those formed of the vinyl resin compositions described below, or other compressed thermoplastic moldable compositions.

Vinyl resins may be made by polymerizing various vinyl esters, and it has been discovered that resins made by the conjoint polymerization (by which is meant the polymerization while in mutual contact) of two or more vinyl esters are greatly different from and represent improvement over the polymers of individual vinyl esters. Resins made by the conjoint polymerization of a vinyl halide, such as vinyl chloride, and a vinyl ester of an aliphatic acid, such as vinyl acetate, propionate, butyrate, etc., are particularly useful. I prefer to use conjoint polymerization products of vinyl halides and vinyl esters of aliphatic acids which contain from about 75% to about 95% by weight of the vinyl halide. Within this group of resins, I have found the best are those formed by conjointly polymerizing vinyl chloride and vinyl acetate in the proportions of about 84% to about 90% by weight of the chloride, and about 87% chloride is here preferred. These resins may be formed by the processes described in Patent 2,064,565 issued December 15, 1936 to E. W. Reid, filed September 25, 1931.

Ordinary vinyl resins prepared by the conjoint polymerization, for example of vinyl chloride and vinyl acetate, contain a mixture of polymeric substances of differing degree of molecular aggregation. The lower molecular weight vinyl polymers have comparatively low and sharp melting points and are more nearly crystalline bodies than the higher molecular weight vinyl polymers which may not melt at all without decomposition or which do not have sharp melting points. The lower molecular weight vinyl polymers are less stable to heat and light than are the high molecular weight polymers. In such ordinary polymerization products are contained, besides vinyl resins of varying molecular weight, small quantities of impurities and unpolymerized vinyl compounds. Unpolymerized vinyl acetate, for example, is irritating to mouth tissues, and when in contact with alkaline bodies changes color forming a highly colored yellow to red material.

The vinyl resin denture material when compounded and colored as desired is most conveniently supplied and made into the finished denture in the form of denture blanks or molded preforms. I have discovered that a departure from the usual form of denture blank or preform facilitates the final molding of improved dentures and enables me to attain the objects of this invention. I prefer to make the blanks with a cross-sectional form which will cause a maximum flow of material when it is thereafter molded. This is contrary to the usual form of such blanks which are customarily preformed to approximate as closely as possible the form of the finished dentures, thus allowing but a minimum of flow when molded. In complete dentures, I make the portion which will eventually contain the teeth, that is, the gum portion, deep and thick to assure maximum flow and provide a thickened portion for the roof of the upper blank. The accompanying drawing will illustrate one form of my improved blanks showning how maximum flow of material is provided, and in which Fig. 1 is a top plan view of an improved upper denture blank according to my invention;

Figure 1:
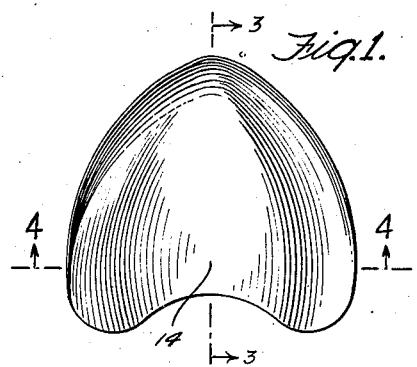
Figure 2:
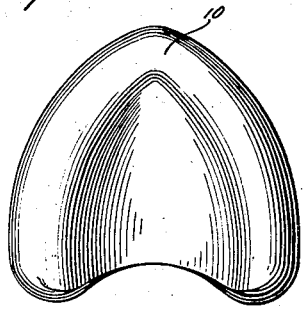
Fig. 2 is a bottom plan view of the denture blank shown in Fig. 1.
Figure 3:
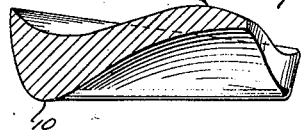
Fig. 3 is a sectional elevation along line 3—3 of Fig. 1.
Figure 4:
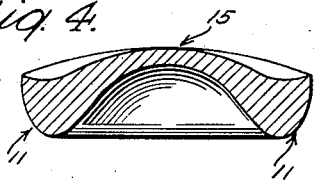
Fig. 4 is a cross-sectional elevation along line 4—4 of Fig. 1.
Figure 5:
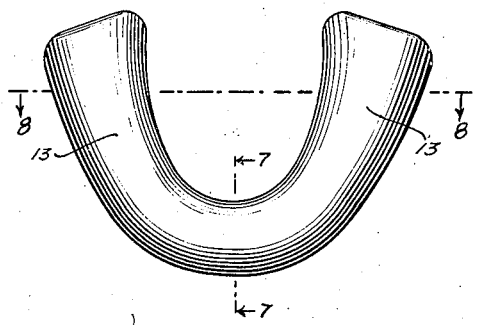
Fig. 5 is a top plan view of an improved lower denture blank according to my invention.
Figure 6:
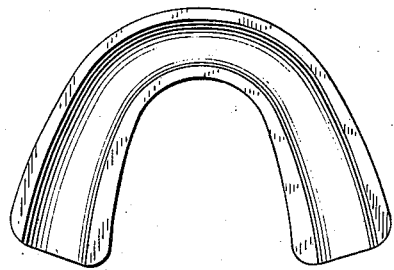
Fig. 6 is a bottom plan view of the improved denture blank of Fig. 5.
Figure 8:
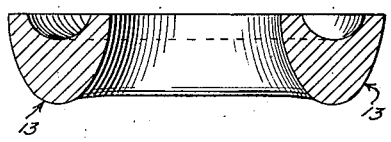
Fig. 8 is a cross-sectional elevation along line 8—8 of Fig. 5.
Figure 7:
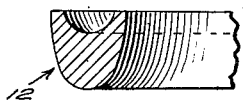
Fig. 7 is a sectional view along line 7—7 of Fig. 5.

Referring to the drawing, I obtain a large amount of flow in the denture material by reason of the great depth of material provided in the gum portions of the blanks as shown at 10 in Fig. 3, at 11 in Fig. 4, at 12 in Fig. 7, and at 13 in Fig. 8. Still greater flow is provided by the thickness of material in the blank as shown at 14 in Fig. 3 and at 15 in Fig. 4.

Blanks or preforms for partial dentures are made to cause similar magnitude of flow by providing them with considerable thickness of material at those points where pressure is applied in molding, as is the case with the blanks illustrated. I prefer to provide a thickness of the preformed compressed moldable material in the gum portions of the blanks which is at least twice that which will remain after the finished denture has been made, and to provide a thickness in roof portions in excess of the thickness of the roof of a finished denture.

An important characteristic of this denture is its moldability. The vinyl resins are not affected by paraffin, mineral oil, triethanolamine, turpentine, or water, and these materials may be used as heating media in the usual autoclave technique for pressing dentures. Vinyl resin dentures may be repeatedly demolded in the course of normal repair. The thermoplasticity of this denture material is such as to permit dentures formed therefrom to be repaired without remolding the whole denture, for example, a tooth may be removed with dental tools, replaced by a new tooth, a quantity of vinyl resin denture material added and fluxed with a hot tool. Dry molding, as ordinarily employed in the plastic industry, may be substituted throughout for the autoclave method using fluid heat transfer media, if desired.

For certain purposes dentures may be reinforced, particularly in the case of partial dentures, and such reinforcement is generally a delicate metal part. The denture material of this invention is characterized by its free flowing properties permitting it to cover completely and to seal over metallic inserts. This is very essential since exposed metal portions of dentures tend to cause unpleasant effects in the mouth.

Composite dentures containing vinyl resins and other denture materials may be formed. In general, ordinary dentures may be improved by surfacing them with vinyl resin compositions. Adherence may be effected by mechanical means, due to the accuracy with which vinyl resins may be molded, and by chemical means, due to partial solubility, dependent upon the particular material used. The vinyl resin compositions shrink upon molding to a very small extent, hence it is sometimes desirable to adopt other expedients to secure adequate anchorage of the teeth in the denture. This may be done by any convenient means. For example, the porcelain teeth may be roughened on the portion thereof which is to be embedded in the vinyl resin. Also, the teeth may be coated with a solution of a resin which is thermosetting and which shrinks considerably to which the vinyl resin will adhere due to partial solubility of the second resin in the vinyl resin. Examples of such materials are resins of the phenol-formaldehyde type or alkyd resins of the glycerol-phthalic anhydride type. These resins are thermo-reactive, and should be cured or reacted before the denture is molded. Both of these thermosetting resins are suitable, particularly the alkyd resins which shrink very appreciably when reacted.

The vinyl resins used in making the denture blanks of this invention are unlike those heretofore known for any purpose, and most nearly possess the properties of an ideal denture as above set forth. They are free from unpolymerized material, low molecular weight and toluene-soluble polymers, catalytic residues, metallic impurities and the like. Also, the vinyl resins of my invention are characterized by toughness, resistance to distortion, low water absorption, poor heat conductivity, good flow in molding and over inserts, resistance to conditions of heat and cold, chemical inertness, and brilliant coloring qualities.

The vinyl resins base of the denture material may be rendered still more stable to light and heat by adding neutral calcium stearate thereto, or a mixture of neutral calcium stearate and a wax, such as carnauba wax, may be added to stabilize the resin and improve its molding qualities. If additional stability to heat is desired, the stabilizing addition may be made alkaline with hydrated lime.

Modifying agents, such as chlorinated diphenyl derivatives, chlorinated napthalene, ethyl abietate, natural resins, polymerized aldehyde resins, polymeric glycol esters, and the like may be added to the vinyl resin compositions to control the plasticity and softening point of the product. The addition of the more highly chlorinated napthalenes increases the hardness of the material, decreases its coefficient of friction and increases the light stability of the product.

It is sometimes desirable to add small amounts of very finely ground silica or other inert transparent or translucent filling material to increase the surface hardness of the denture. In general, from about 5% to 10% filler based on the weight of vinyl resin is the maximum which should be used.

The color of dentures is an especially important feature. In this connection vinyl resin denture material has important and valuable properties. It is very clear and brilliant, making it possible to obtain desired color shades and degrees of brilliancy and translucency. Chemically pure titanium oxide is preferred as an opacifying pigment. Colors, such as lithol red, toluidine toner, rhodamine B base, quinoline yellow base, oil reds, etc., may be used to obtain the color shades. The preferred colors are those which are water insoluble, but water soluble coloring materials may be used if desired. Dentures made as herein described are substantially unaffected by diffused sunlight, and this property enables them to retain any desired shade of coloring.

Vinyl resin dentures when molded by the autoclave method using water or steam as a heating medium may exhibit a water blush on the finished article. Such dentures may be deblushed, when dried, by reheating the surface superficially. For example, deblushing may be accomplished by dipping the denture in boiling water, or by applying hot oil to the surface of the denture in a quantity merely sufficient to heat the surface.

I claim:

1. Denture blank formed of a compressed thermoplastic moldable artificial resin composition in the approximate shape of a denture provided with gum portions to receive the teeth which contain a depth and thickness of said composition substantially twice that which is to remain therein in the finished denture and having substantial additional thickness of said composition in other portions of said blanks which are adapted to receive molding pressure, whereby maximum flow of said composition in molding is obtained.

2. Denture blank formed of a compressed thermoplastic moldable artificial resin composition in the approximate shape of a denture, said blank comprising a gum portion and a roof portion unitary therewith, the thickness of said composition in said gum portion being at least twice that which is to remain therein after molding, and the thickness of said composition in said roof portion being substantially in excess of that which is to be present after molding.

3. Denture blank formed of a compressed thermoplastic moldable artificial resin composition in the approximate shape of a denture, said blank comprising a gum portion containing a depth and thickness of said composition at least twice that which is to remain therein in the finished denture.

4. Denture blank formed of a compressed vinyl resin composition in the approximate shape of a denture, said blank comprising a gum portion and a roof portion unitary therewith, the thickness of said composition in said gum portion being at least twice that which is to remain therein after molding, and the thickness of said composition in said roof portion being substantially in excess of that which is to be present after molding.

5. Denture blank formed of a compressed vinyl resin composition in the approximate shape of a denture, said blank comprising a gum portion containing a depth and thickness of said composition at least twice that which is to remain therein in the finished denture.

6. Denture blank formed of a compressed vinyl resin composition in the approximate shape of a denture, said blank comprising a gum portion and a roof portion unitary therewith, the thickness of said composition in said gum portion being at least twice that which is to remain therein after molding, and the thickness of said composition in said roof portion being substantially in excess of that which is to be present after molding, said vinyl resin composition consisting essentially of resin substantially identical with that resulting from the conjoint polymerization of a vinyl halide and a vinyl ester of an aliphatic acid.

7. Denture blank formed of a compressed vinyl resin composition in the approximate shape of a denture, said blank comprising a gum portion containing a depth and thickness of said composition at least twice that which is to remain therein in the finished denture, said vinyl resin composition consisting essentially of resin substantially identical with that resulting from the conjoint polymerization of a vinyl halide and a vinyl ester of an aliphatic acid.

8. Denture blank formed of a compressed vinyl resin composition in the approximate shape of a denture, said blank comprising a gum portion and a roof portion unitary therewith, the thickness of said composition in said gum portion being at least twice that which is to remain therein after molding, and the thickness of said composition in said roof portion being substantially in excess of that which is to be present after molding, said vinyl resin composition consisting essentially of resin substantially identical with that resulting from the conjoint polymerization of a vinyl halide and a vinyl ester of an aliphatic acid and which contains from about 75% to about 95% by weight of the vinyl halide.

9. Denture blank formed of a compressed vinyl resin composition in the approximate shape of a denture, said blank comprising a gum portion containing a depth and thickness of said composition at least twice that which is to remain therein in the finished denture, said vinyl resin composition consisting essentially of resin substantially identical with that resulting from the conjoint polymerization of a vinyl halide and a vinyl ester of an aliphatic acid and which contains from about 75% to about 95% by weight of the vinyl halide.

FRAZIER GROFF.